United States Patent
Smart (10) Patent No.: US 10,594,483 B2
(45) Date of Patent: Mar. 17, 2020

(54) METHODS AND APPARATUS FOR STORING CONTENT

(71) Applicant: STMicroelectronics (Research & Development) Limited, Marlow (GB)

(72) Inventor: Robert Smart, Weston-super-mare (GB)

(73) Assignee: STMICROELECTRONICS (RESEARCH AND DEVELOPMENT) LIMITED, Marlow (GB)

( * ) Notice: Subject to any disclaimer, the term of this patent is extended or adjusted under 35 U.S.C. 154(b) by 827 days.

(21) Appl. No.: 14/667,256

(22) Filed: Mar. 24, 2015

(65) Prior Publication Data

US 2015/0280913 A1 Oct. 1, 2015

(30) Foreign Application Priority Data

Mar. 27, 2014 (GB) .................... 1405521.4

(51) Int. Cl.
*H04L 9/30* (2006.01)
*H04L 9/08* (2006.01)
*G06F 12/14* (2006.01)

(52) U.S. Cl.
CPC ............ *H04L 9/304* (2013.01); *G06F 12/145* (2013.01); *G06F 12/1408* (2013.01); *G06F 12/1441* (2013.01); *H04L 9/0866* (2013.01); H04L 2209/34 (2013.01); H04L 2209/603 (2013.01)

(58) Field of Classification Search
CPC ..................................................... H04L 9/304
See application file for complete search history.

(56) References Cited

U.S. PATENT DOCUMENTS

| 4,875,160 A | * | 10/1989 | Brown, III | G06F 9/3863 712/228 |
| 5,915,025 A | | 6/1999 | Taguchi et al. | |
| 5,978,892 A | * | 11/1999 | Noel | G06F 12/023 707/999.202 |
| 6,741,258 B1 | * | 5/2004 | Peck, Jr. | G06F 12/1027 345/520 |
| 6,839,777 B1 | * | 1/2005 | Vrancic | G06F 13/28 710/22 |
| 7,320,069 B1 | | 1/2008 | Sundharraj et al. | |

(Continued)

FOREIGN PATENT DOCUMENTS

CN 101802833 A 8/2010
GB 2 396 930 A 7/2004

(Continued)

OTHER PUBLICATIONS

Chinese Office Action, dated Jun. 22, 2017, for corresponding Chinese application No. 201510044128.2, 11 pages.

*Primary Examiner* — Simon P Kanaan
(74) *Attorney, Agent, or Firm* — Seed IP Law Group LLP (57) ABSTRACT

Data processing circuitry has a virtual data buffer, with contiguous virtual addresses of the virtual buffer being associated with discontiguous addresses of a physical memory. Cyphering circuitry coupled between the data processing circuitry and the physical memory responds to a command received from the data processing circuitry by determining a key associated with the command based on virtual buffer address information associated with the virtual buffer.

45 Claims, 7 Drawing Sheets

(56) References Cited

U.S. PATENT DOCUMENTS

| | | | |
|---|---|---|---|
| 8,131,814 B1* | 3/2012 | Schlansker | G06F 13/28 |
| | | | 709/212 |
| 2003/0188153 A1 | 10/2003 | Demoff et al. | |
| 2009/0113424 A1* | 4/2009 | Chen | G06F 9/45558 |
| | | | 718/1 |
| 2010/0161919 A1 | 6/2010 | Dodgson et al. | |
| 2011/0252480 A1 | 10/2011 | Patawaran et al. | |
| 2012/0278635 A1 | 11/2012 | Hars et al. | |
| 2013/0205139 A1 | 8/2013 | Walrath | |
| 2013/0238907 A1 | 9/2013 | Debout et al. | |
| 2013/0311789 A1 | 11/2013 | Johnson et al. | |
| 2015/0113526 A1* | 4/2015 | Baboval | G06F 9/45533 |
| | | | 718/1 |
| 2015/0134855 A1* | 5/2015 | Sheffield | G06F 3/0638 |
| | | | 710/4 |

FOREIGN PATENT DOCUMENTS

| | | |
|---|---|---|
| WO | 2009/088920 A1 | 7/2009 |
| WO | 2010/057191 A2 | 5/2010 |

\* cited by examiner

T1 – Writes to address not in x to y are blocked. Reads may return 0 or encrypted memory content

OR

T2 – Access between x and y are XOR'd selecting computed key based on address

METHODS AND APPARATUS FOR STORING CONTENT

BACKGROUND

Technical Field

Some embodiments relate to methods and apparatus for storing data and in particular but not exclusively to methods and apparatus for storing content.

Description of the Related Art

In the transmission of data such as audio or video data, it is known to arrange the data into packet streams.

This means that firstly, the data is divided into discrete packets of a determined format, each packet comprising a header and a payload. The header may contain various types of control data including at least a packet identifier. The payload then contains the actual information content, e.g., the information such as the audio or video data that the end-user wishes to consume, sometimes also referred to as "user data". The payload may be encoded for compression purposes and encrypted for security, such that the user data is typically not transmitted in its "raw" form. The packet may also comprise redundant information in the form of error correction codes for use in error correction at the receive side.

BRIEF SUMMARY

In an embodiment, a method comprises: receiving first data from a functional block having a virtual buffer, said first data having a first virtual address in said virtual buffer, said virtual buffer having second data, said second data having a second virtual address contiguous with said first virtual address; encrypting said first data using at least one key which is dependent on virtual address information associated with said virtual buffer; and causing said encrypted first data to be written to a location of a physical memory which is non-contiguous to a second location of said second data in said physical memory.

The received first data may be unencrypted data.

In an embodiment, a method comprises: receiving a read request for first data from a functional block having a virtual buffer, said first data having a virtual address in said virtual buffer, said virtual buffer having second data, said second data having a second virtual address contiguous with said first virtual address; reading first data in an encrypted form from a location of a physical memory which is non-contiguous to a second location of said second data in said physical memory; and decrypting said encrypted first data using at least one key which is dependent on virtual address information associated with said virtual buffer.

The method may comprise providing said first data in unencrypted form to said functional block.

The memory may comprise a DDR.

The virtual address information may comprise a first address range.

The method may comprise determining if said virtual address of said first data is within said first address range.

The method may comprise only decrypting said encrypted first data if said virtual address of said first data is within said first address range.

The method may comprise only encrypting said first data if said virtual address of said first data is within said first address range.

The method may comprise receiving the virtual address of said first data.

The method may comprise receiving identification information from said functional block.

The identification information may identify a type of transaction associated with the first data and/or the functional block.

The method may comprise determining if said first data is to be encrypted or blocked in dependence on said received identification information.

The method may comprise determining if said first data is to be decrypted or not in dependence on said received identification information.

The method may comprise: defining said first address range for the virtual buffer; and defining said at least one key in dependence on address information associated with said first address range.

The method may comprise defining a second address range for said virtual buffer and defining at least one key in dependence on address information associated with said second range, said defining of said second range and said respective at least one key being performed while the method is being performed with respect to the first address range.

In an embodiment, a method comprises: defining an address range for a virtual buffer; and defining at least one key in dependence on address information associated with said address range.

In an embodiment, an apparatus comprises a function block having a virtual buffer, with first and second data, said first data having a first virtual address in said virtual buffer and said second data having a second virtual address contiguous with said first virtual address; a second block configured to receive said first data and encrypt said first data using at least one key which is dependent on virtual address information associated with said virtual buffer; and a memory management unit configured to cause said encrypted first data to be written to a location of a physical memory which is non-contiguous to a second location of said second data in said physical memory.

The received first data may be unencrypted data.

The second block may be configured to receive a read request for first data from said functional block, the memory management unit may be configured to read first data in an encrypted form from said physical memory and said second block may be configured to decrypt said encrypted first data using at least one key which is dependent on virtual address information associated with said virtual buffer.

In an embodiment, an apparatus comprises a function block having a virtual buffer, with first and second data, said first data having a first virtual address in said virtual buffer and said second data having a second virtual address contiguous with said first virtual address; a second block configured to receive a read request for first data from said functional block; and a memory management unit configured to read first data in an encrypted form from a location of a physical memory which is non-contiguous to a second location of said second data in said physical memory, said second block configured to decrypt said encrypted first data using at least one key which is dependent on virtual address information associated with said virtual buffer.

The second block may be configured to provide said first data in unencrypted form to said functional block.

The memory may comprise a DDR.

The virtual address information may comprise a first address range.

The second block may be configured to determine if said virtual address of said first data is within said first address range.

The second block may be configured to only decrypt said encrypted first data if said virtual address of said first data is within said first address range.

The second block may be configured to only encrypt said first data if said virtual address of said first data is within said first address range.

The second block may be configured to receive the virtual address of said first data.

The second block may be configured to receive identification information from said functional block.

The identification information may identify a type of transaction associated with the first data and/or the functional block.

The second block may be configured to determine if said first data is to be encrypted or blocked in dependence on said received identification information.

The second block may be configured to determine if said first data is to be decrypted or not in dependence on said received identification information.

The apparatus may comprise a fourth block configured to define said first address range for the virtual buffer; and said second block may be configured to define said at least one key in dependence on address information associated with said first address range.

The fourth block may be configured to define a second address range for said virtual buffer and said second block may be configured to define at least one key in dependence on address information associated with said second range, said defining of said second range and said respective at least one key being performed while actions are being performed with respect to a or the first address range.

In an embodiment, a method comprises: receiving a command associated with a virtual buffer, contiguous virtual addresses of the virtual buffer being associated with discontiguous addresses of a physical memory; determining a key based on virtual buffer address information associated with the virtual buffer; and executing the command using the determined key. In an embodiment, the command is a write request and the method comprises: receiving first data from a functional block having the virtual buffer, the first data having a first virtual address in the virtual buffer, the virtual buffer having second data, the second data having a second virtual address contiguous with the first virtual address; encrypting the first data using at least one key which is dependent on virtual address information associated with the virtual buffer; and causing the encrypted first data to be written to a location of the physical memory which is non-contiguous to a second location of the second data in the physical memory. In an embodiment, the received first data is unencrypted data. In an embodiment, the method comprises: receiving a read request for first data from a functional block having the virtual buffer, the first data having a virtual address in the virtual buffer, the virtual buffer having second data, the second data having a second virtual address contiguous with the first virtual address; reading first data in an encrypted form from a location of the physical memory which is non-contiguous to a second location of the second data in the physical memory; and decrypting the encrypted first data using at least one key which is dependent on virtual address information associated with the virtual buffer. In an embodiment, the method comprises providing the first data in unencrypted form to the functional block. In an embodiment, the virtual address information comprises a first address range. In an embodiment, the method comprises determining if a virtual address associated with the command is within the first address range. In an embodiment, the command is a request to read encrypted first data associated with the virtual address, and the method comprises only decrypting the encrypted first data if the virtual address is within the first address range. In an embodiment, the command is a request to write data associated with a first virtual address, and the method comprises only encrypting and writing the first data if the first virtual address is within the first address range. In an embodiment, the method comprises receiving a virtual address associated with the command. In an embodiment, the method comprises receiving identification information from a functional block associated with the virtual buffer. In an embodiment, the identification information identifies a type of transaction associated with at least one of data and the functional block. In an embodiment, the command is a write command and executing the command comprises determining if data is to be encrypted or blocked based on the received identification information. In an embodiment, the command is a read command and executing the command comprises determining whether to decrypt data based on the received identification information. In an embodiment, the method comprises defining a second address range for the virtual buffer and defining at least one key in dependence on address information associated with the second address range.

In an embodiment, an apparatus comprises: an interface configured to receive a command associated with an address of a virtual buffer, contiguous virtual addresses of the virtual buffer being associated with discontiguous addresses of a physical memory; and cyphering circuitry coupled to the interface and configured to determine a key associated with the command based on virtual buffer address information associated with the virtual buffer. In an embodiment, the cyphering circuitry is configured to respond to a received write command by, encrypting data associated with the command using the key; and initiating writing of the encrypted data to a location of the physical memory associated with the address of the virtual buffer. In an embodiment, the cyphering circuitry is configured to respond to a received read command by, initiating retrieval of encrypted data from a location in the physical memory associated with the address of the virtual buffer; and decrypting the retrieved data using the determined key. In an embodiment, the interface is configured to couple to a functional block associated with the virtual buffer. In an embodiment, the cyphering circuitry comprises a windowed cyphering block. In an embodiment, the apparatus comprises a memory interface configured to couple to the physical memory. In an embodiment, the virtual address information comprises a first address range. In an embodiment, the cyphering circuitry is configured to determine whether the virtual address associated with the command is within the first address range. In an embodiment, the cyphering circuitry is configured to initiate execution of the command based on the determination of whether the virtual address is within the first address range. In an embodiment, the interface is configured to receive identification information from a functional block associated with the virtual buffer. In an embodiment, the cyphering circuitry is configured to initiate execution of the command based on received identification information.

In an embodiment, a system comprises: data processing circuitry having a virtual data buffer, contiguous virtual addresses of the virtual buffer being associated with discontiguous addresses of a physical memory; and cyphering circuitry coupled to the data processing circuitry and configured to respond to a command received from the data processing circuitry by determining a key associated with the command based on virtual buffer address information associated with the virtual buffer. In an embodiment, the cyphering circuitry is configured to respond to a received write command by, encrypting data associated with the command using the key; and initiating writing of the encrypted data to a location of the physical memory associated with the address of the virtual buffer. In an embodiment, the cyphering circuitry is configured to respond to a received read command by, initiating retrieval of encrypted data from a location in the physical memory associated with the address of the virtual buffer; and decrypting the retrieved data using the determined key. In an embodiment, the cyphering circuitry comprises a windowed cyphering block. In an embodiment, the system comprises a memory management unit coupled to the cyphering circuitry. In an embodiment, the virtual address information comprises a first address range. In an embodiment, the cyphering circuitry is configured to determine whether the virtual address associated with the command is within the first address range. In an embodiment, the cyphering circuitry is configured to initiate execution of the command based on the determination of whether the virtual address is within the first address range. In an embodiment, the cyphering circuitry is configured to initiate execution of the command based on identification information received from the data processing circuitry. In an embodiment, the system comprises the physical memory and a central processing unit.

In an embodiment, a computer program comprises program code adapted to perform the method(s) may also be provided. The computer program may be stored and/or otherwise embodied by a carrier medium.

In the above, many different embodiments have been described. It should be appreciated that further embodiments may be provided by the combination of any two or more of the embodiments described above.

BRIEF DESCRIPTION OF THE SEVERAL VIEWS OF THE DRAWINGS

Reference is now made by way of example only to the accompanying Figures in which:

FIG. 4 shows a method for the behavior of a read/write access if keys have or have not been established for;

DETAILED DESCRIPTION

One technique for transmitting data streams is to multiplex a plurality of streams into a combined stream known as a "transport stream". An example application of this technique is shown schematically in FIG. 6, which shows a digital television transmitter 100 broadcasting digital media to a plurality of receiving user terminals 102. The transmitter 100 could for example be a satellite transmitter for transmitting wireless, digital transport stream signals via a network of one or more satellites; or a terrestrial television transmitter for transmitting wireless, digital transport stream signals via a network of one or more land-based repeater stations. The transport streams may alternatively or additionally be delivered via a wired network.

Figure 6:
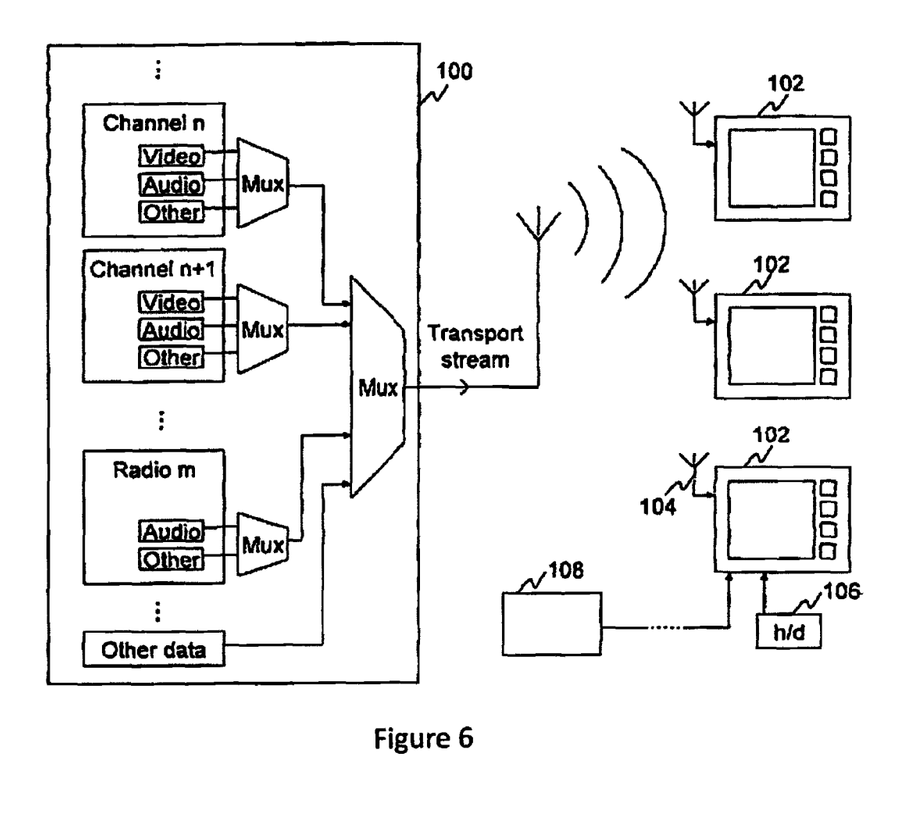
FIG. 6 is a schematic block diagram of a media communication network.

A user terminal 102 could for example be a television set with an integrated digital receiver, a set-top box connected to a television set, a digital radio, or a portable terminal equipped with an appropriate receiver, computer, a tablet, a phone or any other suitable device.

The transmitter 100 is to broadcast the content of a plurality of different concurrent television channels. In the terminology of transport streaming, a group of related streams intended for simultaneous consumption by the same user are together referred to as a program. For example, the output content of a television channel n may comprise a program in the form of a video stream, one or more audio streams (e.g., two or more in the case of different languages), and optionally another data stream comprising other related data such as text summarizing the program or data for use in an interactive service.

The transmitter 100 may broadcast the content of a radio station (e.g., pure audio content without video). For example, the output content of a radio station may comprise a radio program in the form of one or more audio streams and optionally another data stream providing program information.

The transmitter 100 may alternatively or additionally transmit a separate data stream of other non-audio/video data not specifically related to any one particular channel or station, such as text providing program listings, or interactive content.

At the transmitter 100, the audio, video and/or other data streams of each program are multiplexed together into a respective transport stream. Those transport streams are then multiplexed together into a combined transport stream for transmission. The multiplexing is then typically by time-division multiplexing such that transport packets are interleaved with one another in time.

To aid in selecting and handling the streams of the required program at the receivers 102, some control information may be included in the transport stream by the transmitter 100. The transport packets of a program each comprise synchronization information, typically in the form of a synchronization byte.

In addition or alternatively, a receiver 102 may also be able to retrieve stored content streams from a hard drive 106, or content streams via a wired connection to another source 108 such as a cable television provider or the Internet.

Security operations may be performed as part of the transmit and receive processing of the content streams. For example, this may involve encrypting the streams prior to transmission and decrypting them again at the receiver, so as to prevent unauthorized users exploiting the transmission.

Figure 7:
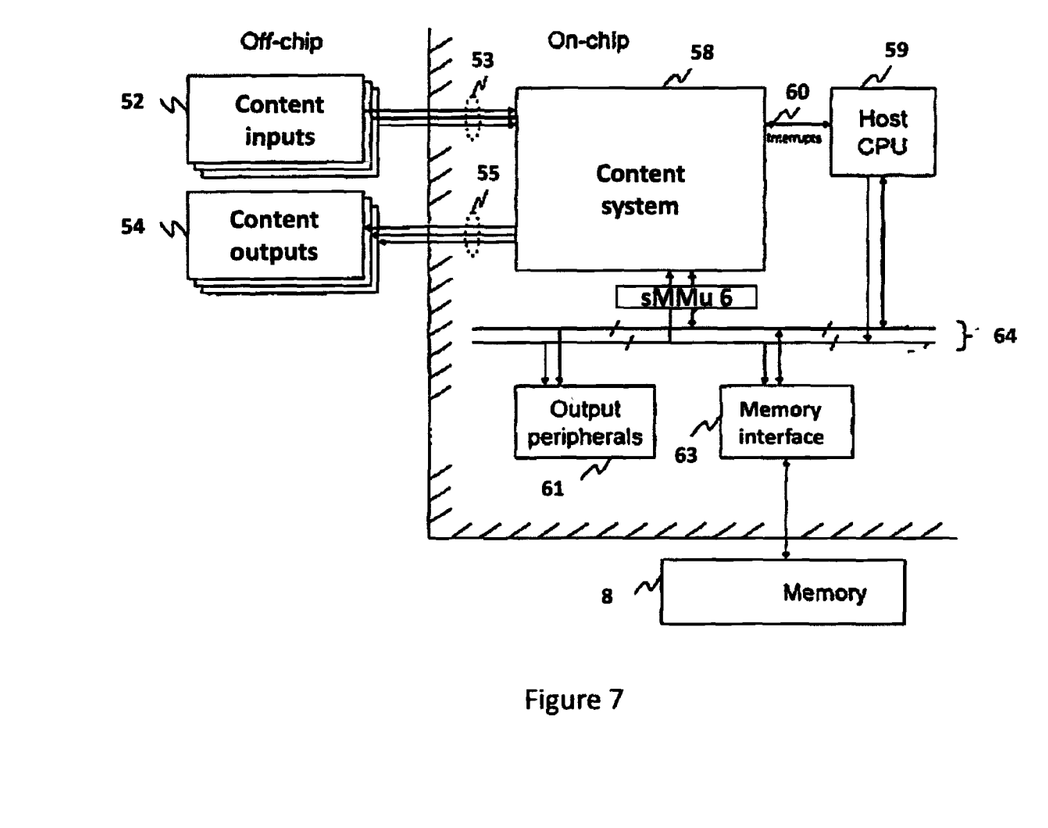
FIG. 7 is a schematic block diagram of a receiver system for processing streams received over the communication network.

FIG. 7 shows a schematic block diagram of a receiver apparatus which may be provided in a user terminal or device for receiving and processing content. The content may be transport streams and/or any other form of content. The apparatus has one or more chips and/or one or more dies. The one or more chips and/or one or more dies comprise a content system 58 (which will be described in more detail later), a host CPU 59, a memory interface 63, optionally one or more output peripherals 61, a system memory management unit sMMU 6 and a communication network 64. The communication network can take any suitable form and may be a bus network and/or a network on chip.

The content system 58, host CPU 59, memory interface 63, and output peripherals 61 may be coupled to one another by the communication network 64, Further, the content system 58 may be coupled to the host CPU 59 via one or more interrupt lines 60. The memory interface 63 may be coupled to an off-chip/die system memory 8 such as a DDR or other RAM (although in some embodiments, alternatively or additionally an on-chip/die system memory could be used).

Further external, off-chip/die interfaces may be provided. These may include content input interfaces 53 and content output interfaces 55. The content system 58 may be coupled to one or more content inputs 52. The content system 58 may be coupled to one or more content outputs 54 off-chip.

Content owners would like to be able to prevent content from being pirated. The content can take any suitable form and may be audio and video content. The content may be a movie or any other content.

During delivery to a set-top-box (STB) such content is encrypted and the keys may be managed by a Conditional Access or Digital Rights Management system. Once delivered, the content is decrypted. Some embodiments may facilitate ensuring that the clear streams are not accessible by unauthorized entities.

Some STBs may only execute digitally authenticated software. However if non-trusted, open or non-secure frameworks are to be supported, this is no longer practical. This may be because there may be a relatively large amount of code required to show that it is secure, even if digitally signed. Some embodiments may be used with downloadable applications. These applications may not be considered to be secure and/or may not be digitally signed. By way of example only, Linux and Android may be considered to be examples of such a frame work.

Secure Data Path (SDP) requires that the decrypted streams cannot be accessed by the non-trusted, open or non-secure software. A secure data path is one provided between end points which have only a secure path between the two ends for at least some data.

It has been proposed to provide SDP using hardware security mechanisms called compartment IDs (CID) and compartment aware filters (CAF), which allow or deny access to memory buffers. This requires the establishment of physically contiguous memory pools to hold the content buffers to be secured (secure memory). The software allocates buffers from the required memory pool, content in the "secure memory", and non-content in "non-secure memory". Only the latter would be accessible by the application processor.

The application level software may not be aware of the type of memory that should be allocated. If the software is an open framework, e.g., Gstreamer, then modification might be required to add memory type awareness resulting in a non-standard implementation. Partitioning memory may adversely affect application level software.

Physically contiguous memory may be difficult to manage.

An alternative approach is to use memory management hardware. The MMU page size and alignment may be 64 KB. If the application is not aware of the memory type needed then each allocation is placed in an MMU page. For example, an allocation of 1 KB will consume 64 KB of memory. Two separate allocations of, say 1 KB and 2 KB, would consume 128 KB of memory. This may be wasteful of memory. This may be disadvantageous in products in which there is limited memory available.

Figure 1:
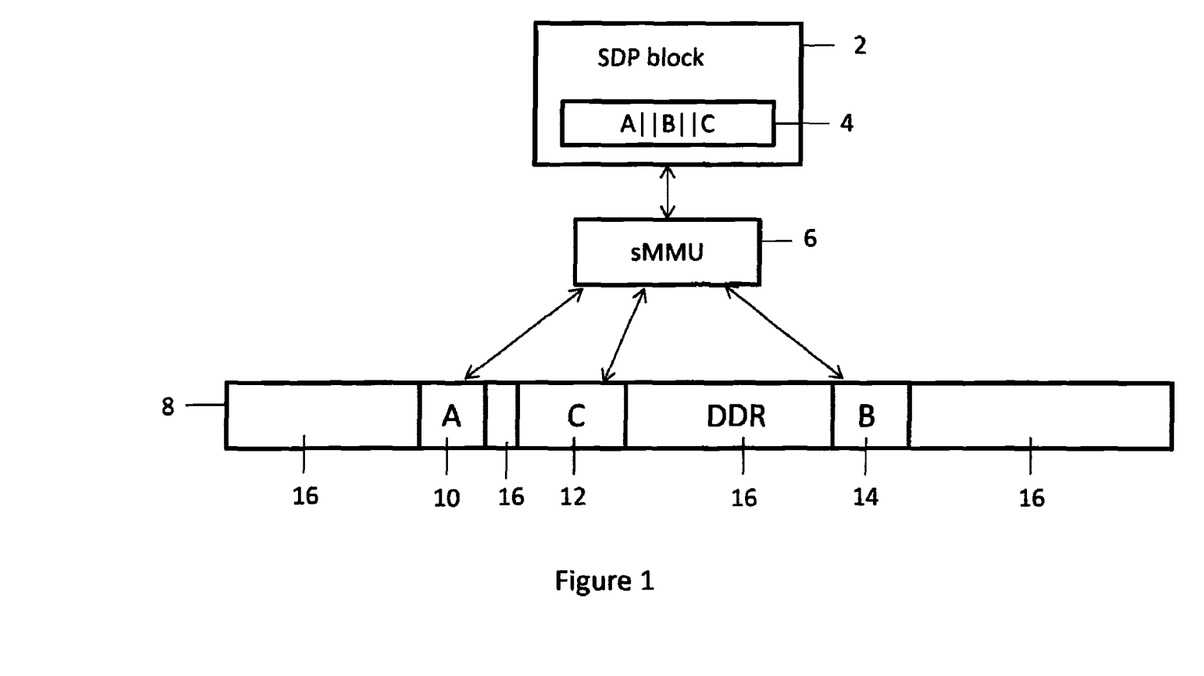
FIG. 1 schematically shows an arrangement for writing and/or reading data with respect to a memory.

Reference is made to FIG. 1 which shows a functional block 2. The functional block is referred to as an SDP block and is one which is used for processing data in the context of an SDP. By way of example only, the functional block may be one which provides one or more of the following functions: video decoding, audio decoding, image capture, audio capture, video processing, audio processing and data processing.

The SDP block 2 has a virtualized buffer 4 containing data A, data B and data C. It should be appreciated that this is by way of example and the buffer can contain two or more segments of data. In some embodiments, the SDP block 2 works with virtual addresses and the buffer is virtually contiguous. In other words, data A, data B and data C are considered by the SDP block to be stored in adjacent virtual locations. However, the physical location of the data A, B and C in the memory (DDR) is dis-contiguous as is described in more detail later.

As can be seen, a first memory location 10 of the DDR stores data A, the second memory location 14 stores data B and the third memory location 12 stores data C. The other parts of the DDR are referenced 16. Thus, the 64 KB pages of the virtual buffer of the SDP block 2 are stored in dis contiguous address locations. In some embodiments, depending on the size of the data, data A, data B and data C may be stored on physical different pages of the virtual buffer. This may not be consistent with the use of physically contiguous physical memory for the CID/CAF approach discussed above.

A system MMU 6 is provided which is able to translate accesses to the virtual buffer to locations in the physical memory 8. In this example, the physical memory 8 is a DDR but in other situations may be provided by any other suitable type of memory.

Figure 2:
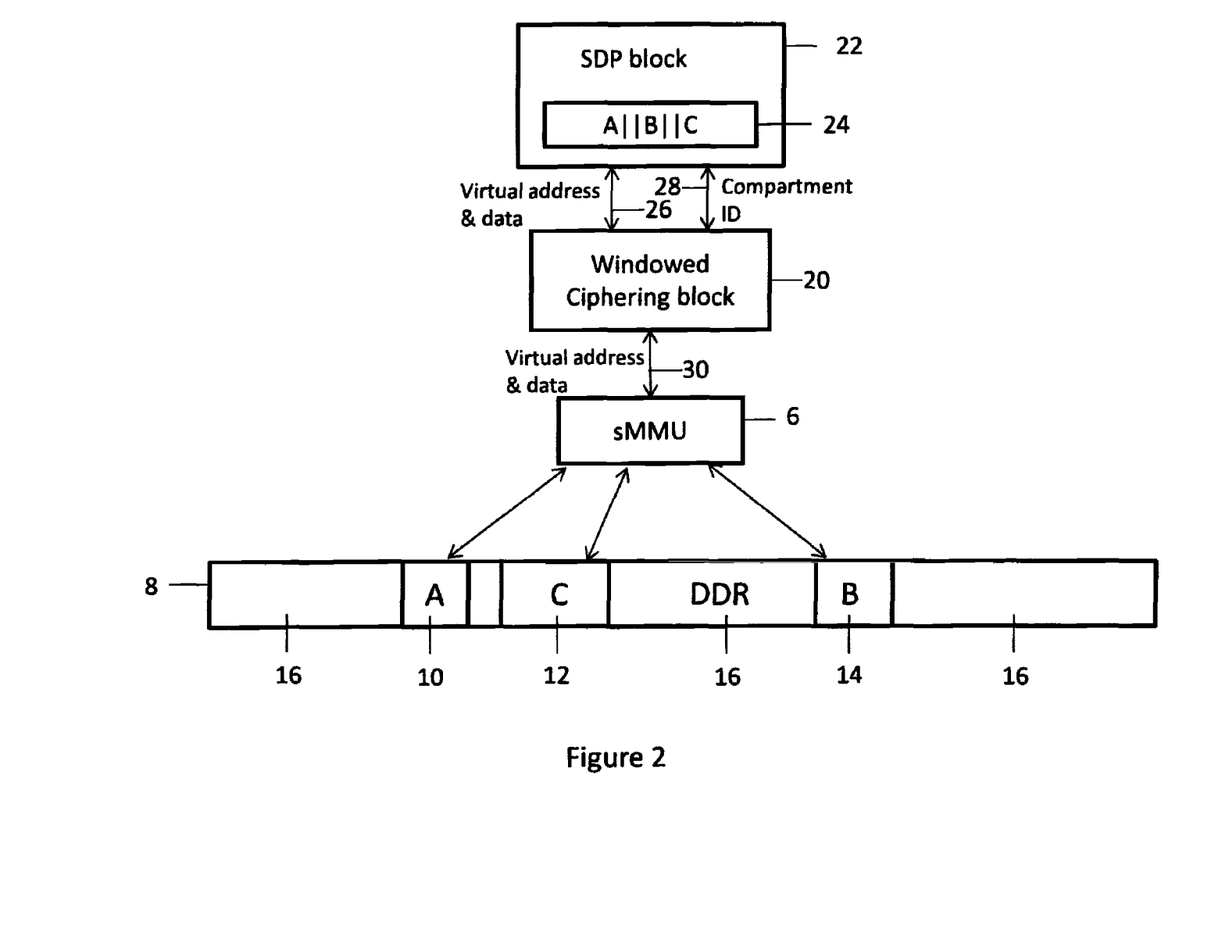
FIG. 2 schematically shows an arrangement where data is encrypted before being written to memory and decrypted on being read out of memory.

Reference is made to FIG. 2 which shows an embodiment. An SDP block 22 is provided with a virtual buffer 24 as described in relation to FIG. 1. This SDP block 22 works with virtual addresses so that the buffer is virtually contiguous.

A windowed ciphering block 20 is provided as is an sMMU 6. The windowed ciphering block 20 is arranged between the SDP block 22 and the sMMU block 6.

It should be appreciated that in this example, the data A is written to memory location 10, data C is written to memory location 12 and data B is written to memory location 14. The data when temporarily stored in the SDP block is un-encrypted data. The SDP block may have a small amount of memory. This small amount of memory may in some embodiments be smaller than the virtual buffer. The SDP block memory may be a temporary store for data in some embodiments.

A virtual address, the un-encrypted data 26 and identity information 28 are provided to the windowed ciphering block 20. The identity information may identify a type of data, for example secure and non-secure data or the nature of the transaction. The identity information may provide information about the security status of a transaction. Additionally or alternatively, the identity information may identify a functional block. The identity information may be a compartment ID.

The windowed ciphering block 20 will output the virtual address and encrypted data 30. The windowed ciphering block 20 will use stream cipher type encryption based on for example a strong cipher such as AES (advanced encryption standard) partially seeded from a secret value. The address 26 and CID 28 are used to determine behavior. Thus, the windowed ciphering block 20 causes the data to be output in an encrypted form.

The virtual address is translated by the sMMU to the physical address and the encrypted data is written into memory at that physical address by the sMMU 6.

The above process describes the writing of data to the DDR.

For a read operation, the SDP will provide the virtual address of the data to be read out of the DDR and the identity information to the windowed ciphering block 20. The windowed ciphering block will provide the virtual address to the sMMU which can translate the virtual address to the physical address and fetch the data from that physical address. Data read out of the DDR via the sMMU is provided to the windowed ciphering block 20. As the data is from the virtual buffer, the windowed ciphering block 20 is able to decrypt the data and provide the unencrypted data to the SDP block.

Figure 3:
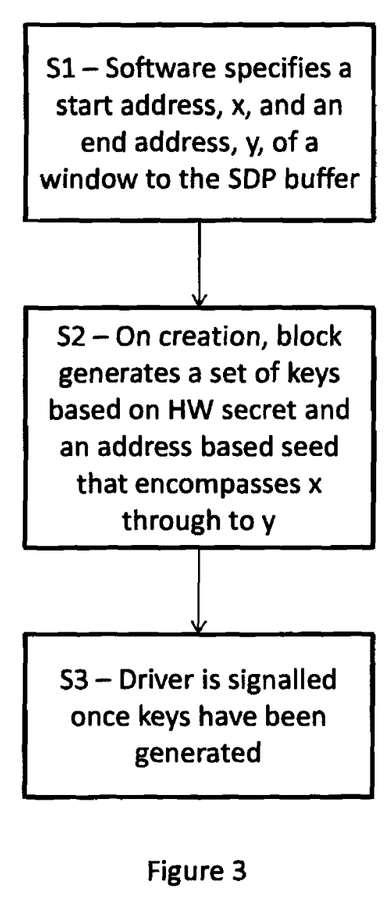
FIG. 3 shows a method for establishing the keys for memory read/write.

Reference is made to FIG. 3 which shows a flow diagram for the initialization of the windowed ciphering block. It should be appreciated that the steps S1 and S3 may be performed by for example driver software of the CPU 59 or any other suitable driver software. Step S2 may be carried out by the windowed ciphering block.

In step S1, software of the windowed ciphering block specifies a start address x and an end address y of a window to the physical SDP buffer. The window is defined in the virtual address space. The window may encompass the entire virtual buffer or only a part of the buffer. The size of the window may be selected to be a fixed size in some embodiments. In other embodiments, the size of a window is a variable size. In some embodiments if the virtual buffer is larger than the window size, the window may be selectively applied such that all accesses to the virtual buffer by the SDP result in a valid window within the windowed ciphering block 20. In practice this may mean run-time creation and destruction of the windows within the windowed ciphering block 20.

Note that the window is in the virtual address space, before the translation by the sMMU to physical addresses. Thus the windowed ciphering block may be unaware of the physical fragmentation of the data in the DDR.

In step S2, on creation, the windowed ciphering block will generate a set of keys based on a hardware secret and an address-based seed that encompasses x through to y. The window may be at least the same size or larger than the address range x to y. In some embodiments, the virtual buffer may be larger than the window. In other embodiments, the virtual buffer 24 is smaller than the supported window size, then x-y may be larger for example because some types of cryptography requires multiples of n bytes and multiples of n-byte alignment within the virtual address space of the SDP block. The value of n can be any suitable value. In some embodiments, n may be 16. In some embodiments, the virtual buffer may be arbitrarily aligned and/or of arbitrary size. In some embodiments a window may be provided which is smaller than one key or larger than one key. A window may overlap one or more keys, at least partially.

As mentioned above the window does not need to be aligned with key edges but may be in some embodiments.

In step S3, the driver is signaled once keys have been generated. The windowed ciphering block 20 may send an interrupt to the host CPU 59, when it has created all the keys for the window from x to y. Once this has been done, the driver software of the host CPU can program the SDP block so that the SDP block is able to access the address range x-y of the virtual buffer.

It should be appreciated that the use of two windows would allow ping-pong use to mask the key computation time. In other words, the method of FIG. 3 can be carried out such that the method is carried out at least partially in parallel for different windows of the buffer. It should be appreciated in some embodiments, the timing of the method steps of FIG. 3, where there are two or more windows may be offset in order to make efficient use of the processing resources of the windowed ciphering block. Thus, key computation time may be masked. The time from the SDP block 22 to the windowed ciphering block 20 to sMMU 6 to the DDR is a full speed or real time path. Whilst this access is occurring the next window is set up so that the next full speed or real time access can take place. In other words there are two timing paths, one is the real time access and the other is the ping-pong masked set-up time.

It should be appreciated that in some embodiments, all transactions prior to establishment of the keys may be blocked. For example, using the CID 28.

Figure 4:
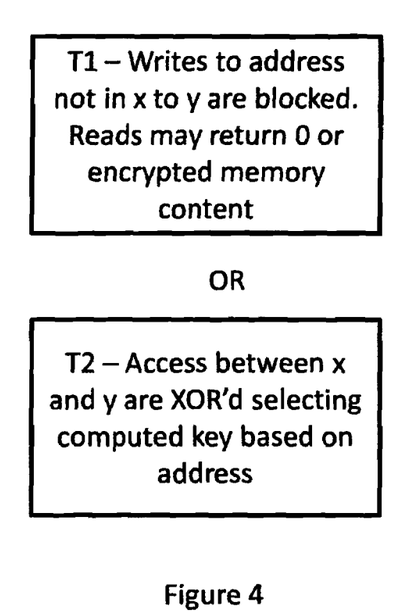

Reference is made to FIG. 4 which shows two alternatives accesses—one where the access is to the address range x-y and the other which is not. The steps shown in FIG. 4 may be performed by the windowed ciphering block after the initialization described in relation to FIG. 3.

In step T1, writes by the SDP block to addresses not in the range of x to y are blocked. Reads to addresses not in the address range x to y may return a value such as zero or encrypted memory content.

In the alternative step T2, accesses between the address range x and y may be exclusively ORed (XORed) selecting the computed key based on the address. It should be appreciated that the XOR function is only one example and any other reversible pseudo random permutation may be used. The use of the exclusive OR or a similar function may reduce throughput.

In the case of T1 and T2, the SDP will output the virtual address of the data to be written, the data and the identity information. The windowed ciphering block 20 will determine if the virtual address is within the address range.

If not the windowed ciphering block will reject the write request. It should be appreciated that the windowed ciphering block may not reject the write request even if the virtual address is outside the address range. This may be if the write request is for non-secure data such as control data. This may be determined in dependence on the identity information.

If the virtual address is within the address range, then the windowed ciphering block will encrypt the data using a set of keys. The encrypted data and the virtual address are provided to the sMMU 6 which will map the virtual address to a physical location in the DDR.

A similar process may apply for read requests. The SDP will output the virtual address of the data to be read and the compartment ID. The windowed ciphering block 20 will determine if the virtual address is within the address range. In some embodiments, this checking may be omitted and all requests are passed through to the sMMU.

If not the windowed ciphering block will reject the read request.

If the virtual address is within the address range, then the windowed ciphering block will provide the virtual address to the sMMU 6 which will map the virtual address to a physical location in the DDR and read the data out of DDR. The data in encrypted form and optionally the virtual address are provided to the windowed ciphering block. The windowed ciphering block may determine if the virtual address is in the address range. This may be omitted in some embodiments if the windowed ciphering block has previously checked the address range and rejected any requests which are not allowed.

If the data is in the address range, then the encrypted data is decrypted.

It should be appreciated that the windowed ciphering block may not reject the read request and/or the read data even if the virtual address is outside the address range. This may be if the read request is for non-secure data such as control data. This may be determined in dependence on the compartment ID.

Figure 5:
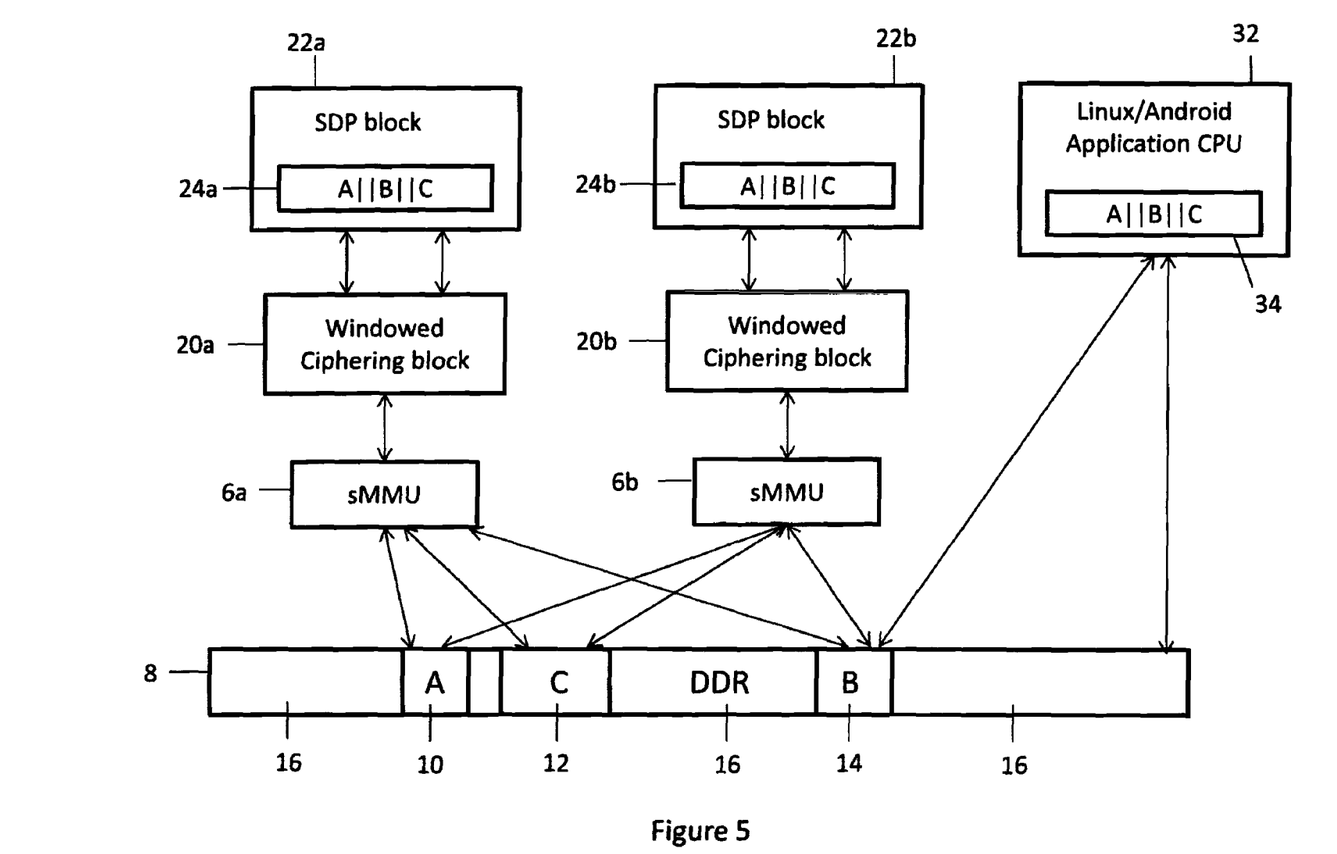
FIG. 5 schematically shows an arrangement where a plurality of functional blocks utilize a common memory.

Reference is made to FIG. 5 which shows an example of an embodiment where there are two SDP blocks 22a and 22b and a Linux and/or Android application CPU 32. Each SDP block 22a and 22b has a respective buffer 24a and b. Respective windowed ciphering blocks 20a and 20b are provided along with respective sMMU 6a and 6b. The application CPU may have a virtual buffer 34. The buffer 34 has data A, data B and data C but only the encrypted form of that data. Thus, the application CPU has access only to the encrypted form of the arbitrary byte aligned and sized buffers but has clear access elsewhere in the DDR.

In this example, the two SDP blocks 22a and 22b both have access to the same encrypted data and the facility to decrypt that data via the windowed ciphering blocks 20a and 20b. In this example, the windowed ciphering blocks 20a and 20b are provided with the same hardware seed value and are provided with the same virtual address to generate the same key to establish a protected data flow.

In some embodiments, AES is used. If AES is used then the cipher block size may be 16 bytes This means that the address used in the key generation ignores the 4 least significant, $2^3$ to $2^0$, bits resulting also in a 16 byte alignment within the memory map.

Addresses x and y can be byte aligned due to the bit-wise XOR operation or any other suitable operation as mentioned previously. This may be a desired behavior; arbitrary byte alignment. The key for the first block of data X should encompass the address x. Likewise the key for the last block Y should encompass the address y. Hence;

$X \leq x < X+16$ $y \leq Y < y+16.$

This arrangement may require a 16 byte key for every 16-bytes of memory in the window.

Some embodiments may use fewer keys with a block size=$2^n$.

The key generation may ignore the n least significant bits of the address, e.g., $2^{n-1}$ to $2^0$.

If bits $2^m$ to $2^n$ (m≥n) are also ignored, the computed key is replicated $2^{m-n+1}$ times and thus many fewer keys are required. This may reduce the functional block size and key establishment time but the level of protection may be potentially reduced.

In some embodiments, access to the memory is not denied but the data retrieved will be encrypted for an unauthorized requester. Removal of the windowing may not remove the relatively strong encryption of the data stored in the memory.

Some embodiments may facilitate providing one or more of the following advantages.

Encryption that is relatively strong may be provided through windowing that limits the number of keys required at one time to a reasonable number.

The stream type cipher may not impact performance once the window has been established.

Each functional block may be identified by an identity such as a compartment ID. This means that access rights may be specified on a per compartment ID basis.

The protected buffer of the SDP block can be of an arbitrary size and/or alignment in the DDR. It should be appreciated that in some embodiments hardware limitations may place an upper limit on the size of the window at any one time.

In some embodiments, the application can allocate virtual buffers without regard to type (secure or non-secure) and without alignment and size constraints. It is only the driver that establishes the ciphering windows, and the driver that is aware of the type memory.

In some embodiments, the blocking behavior on secure transactions means that a failure to establish a window results in no access making it fail in a safe way.

In some embodiments, data may be freely accessed by any other initiator because only encrypted data will be returned.

In general, the various embodiments may be implemented in hardware or special purpose circuits, software, logic or any combination thereof. Some embodiments may be implemented by hardware. Alternative embodiments may be implemented in software. Some embodiments may be implemented by a combination of hardware and software.

An appropriately adapted computer program code product or products may be used for implementing the embodiments, when loaded on an appropriate data processing apparatus. The program code product for providing the operation may be stored on, provided and embodied by means of an appropriate carrier medium. An appropriate computer program can be embodied on a computer readable record medium. A possibility is to download the program code product via a data network.

Some embodiments have been described in relation to apparatus provided in set top boxes. It should be appreciated that this is by way of example only and other embodiments may be provided in other suitable device which receives data. Some embodiments have been described in relation to the writing of content to memory and/or reading of that content. It should be appreciated that other embodiments may be used with any other suitable data.

Some embodiments have been described in relation to Linux and/or Android applications. It should be appreciated that this is by way of example only and other embodiments may be used with any other suitable application.

Some embodiments may take the form of or include computer program products. For example, according to one embodiment there is provided a computer readable medium including a computer program adapted to perform one or more of the methods or functions described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some of the systems and/or modules and/or circuits and/or blocks may be implemented or provided in other manners, such as at least partially in firmware and/or hardware, including, but not limited to, one or more application-specific integrated circuits (ASICs), digital signal processors, discrete circuitry, logic gates, shift registers, standard integrated circuits, state machines, look-up tables, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   receiving a command associated with a virtual buffer, the virtual buffer being configured to store data packets of a data stream, contiguous virtual addresses of the virtual buffer being associated with discontiguous addresses of a physical memory;
   determining whether a virtual address associated with the command is within an address range; and
   in response to determining the virtual address associated with the command is within the address range,
      determining a key based on virtual buffer address information associated with the virtual buffer, wherein the key is generated based on an address-based seed associated with a window defined in the virtual address space; and
      executing the command using the determined key.

2. The method of claim 1 wherein the command is a write request and the method comprises:
   receiving first data from a functional block having the virtual buffer, the first data having a first virtual address in the virtual buffer, the virtual buffer having second data, the second data having a second virtual address contiguous with the first virtual address;
   encrypting the first data using at least one key which is dependent on virtual address information associated with the virtual buffer; and
   causing the encrypted first data to be written to a location of the physical memory which is non-contiguous to a second location of the second data in the physical memory.

3. The method of claim 2 wherein the received first data is unencrypted data.

4. The method of claim 1, comprising:
   receiving a read request for first data from a functional block having the virtual buffer, the first data having a virtual address in the virtual buffer, the virtual buffer having second data, the second data having a second virtual address contiguous with the first virtual address;
   reading first data in an encrypted form from a location of the physical memory which is non-contiguous to a second location of the second data in the physical memory; and
   decrypting the encrypted first data using at least one key which is dependent on virtual address information associated with the virtual buffer.

5. The method of claim 4, comprising providing the first data in unencrypted form to the functional block.

6. The method of claim 1 wherein the virtual address information comprises a first address range.

7. The method of claim 6, comprising determining if a virtual address associated with the command is within the first address range.

8. The method of claim 7 wherein the command is a request to read encrypted first data associated with the virtual address, comprising only decrypting the encrypted first data if the virtual address is within the first address range.

9. The method of claim 7 wherein the command is a request to write data associated with a first virtual address, comprising only encrypting and writing the first data if the first virtual address is within the first address range.

10. The method of claim 1, comprising receiving a virtual address associated with the command.

11. The method of claim 1, comprising receiving identification information from a functional block associated with the virtual buffer.

12. The method of claim 11 wherein the identification information identifies a type of transaction associated with at least one of data and the functional block.

13. The method of claim 11 wherein the command is a write command and executing the command comprises determining if data is to be encrypted or blocked based on the received identification information.

14. The method of claim 11 wherein the command is a read command and executing the command comprises determining whether to decrypt data based on the received identification information.

15. The method of claim 6, comprising defining a second address range for the virtual buffer and defining at least one key in dependence on address information associated with the second address range.

16. An apparatus, comprising:
   interface circuitry configured to receive a command associated with an address of a virtual buffer, the virtual buffer being configured to store data packets of a video data stream, contiguous virtual addresses of the virtual buffer being associated with discontiguous addresses of a physical memory; and
   cyphering circuitry coupled to the interface and configured to determine whether the address associated with the virtual buffer is within an address range, and, in response to determining the address associated with the virtual buffer is within the address range,
      determine a key associated with the command based on virtual buffer address information associated with the virtual buffer, wherein the key is generated based on an address-based seed associated with a window defined in the virtual address space; and
      initiate execution of the command.

17. The apparatus of claim 16 wherein the cyphering circuitry is configured to respond to a received write command by,
   encrypting data associated with the command using the key; and
   initiating writing of the encrypted data to a location of the physical memory associated with the address of the virtual buffer.

18. The apparatus of claim 16 wherein the cyphering circuitry is configured to respond to a received read command by,
   initiating retrieval of encrypted data from a location in the physical memory associated with the address of the virtual buffer; and
   decrypting the retrieved data using the determined key.

19. The apparatus of claim 16 wherein the interface circuitry is configured to couple to a functional block associated with the virtual buffer.

20. The apparatus of claim 16 wherein the cyphering circuitry comprises a windowed cyphering block.

21. The apparatus of claim 16, comprising a memory interface configured to couple to the physical memory.

22. The apparatus of claim 16 wherein the virtual address information comprises a first address range.

23. The apparatus of claim 22 wherein the cyphering circuitry is configured to determine whether the virtual address associated with the command is within the first address range.

24. The apparatus of claim 23 wherein the cyphering circuitry is configured to initiate execution of the command based on the determination of whether the virtual address is within the first address range.

25. The apparatus of claim 16 wherein the interface circuitry is configured to receive identification information from a functional block associated with the virtual buffer.

26. The apparatus of claim 25 wherein the cyphering circuitry is configured to initiate execution of the command based on received identification information.

27. A system, comprising:
data processing circuitry having a virtual data buffer, the virtual data buffer being configured to store data packets of a data stream and contiguous virtual addresses of the virtual buffer being associated with discontiguous addresses of a physical memory; and
cyphering circuitry coupled to the data processing circuitry and configured to respond to a command received from the data processing circuitry by determining whether an address associated with the command is within an address range, and, in response to a determination the address associated with the command is within the address range,
determine a key associated with the command based on virtual buffer address information associated with the virtual buffer, wherein the key is generated based on an address-based seed associated with a window defined in the virtual address space; and
initiate execution of the command.

28. The system of claim 27 wherein the cyphering circuitry is configured to respond to a received write command by,
encrypting data associated with the command using the key; and
initiating writing of the encrypted data to a location of the physical memory associated with the address of the virtual buffer.

29. The system of claim 27 wherein the cyphering circuitry is configured to respond to a received read command by,
initiating retrieval of encrypted data from a location in the physical memory associated with the address of the virtual buffer; and
decrypting the retrieved data using the determined key.

30. The system of claim 27 wherein the cyphering circuitry comprises a windowed cyphering block.

31. The system of claim 27, comprising a memory management circuit coupled to the cyphering circuitry.

32. The system of claim 27 wherein the virtual address information comprises a first address range.

33. The system of claim 32 wherein the cyphering circuitry is configured to determine whether the virtual address associated with the command is within the first address range.

34. The system of claim 33 wherein the cyphering circuitry is configured to initiate execution of the command based on the determination of whether the virtual address is within the first address range.

35. The system of claim 27 wherein the cyphering circuitry is configured to initiate execution of the command based on identification information received from the data processing circuitry.

36. The system of claim 27, comprising the physical memory and a central processor.

37. A method, comprising:
receiving a command associated with a virtual buffer, the virtual buffer being configured to store data packets of a data stream and contiguous virtual addresses of the virtual buffer being associated with discontiguous addresses of a physical memory;
determining, based on identification information associated with the virtual buffer, whether to execute the command; and
in response to a determination to execute the command, determining a key based on virtual buffer address information associated with the virtual buffer, wherein the key is generated based on an address-based seed associated with a window defined in the virtual address space; and
executing the command using the determined key.

38. The method of claim 37 wherein the command is a write request and the method comprises:
receiving first data from a functional block having the virtual buffer, the first data having a first virtual address in the virtual buffer, the virtual buffer having second data, the second data having a second virtual address contiguous with the first virtual address;
encrypting the first data using at least one key which is dependent on virtual address information associated with the virtual buffer; and
causing the encrypted first data to be written to a location of the physical memory which is non-contiguous to a second location of the second data in the physical memory.

39. The method of claim 37, comprising:
receiving a read request for first data from a functional block having the virtual buffer, the first data having a virtual address in the virtual buffer, the virtual buffer having second data, the second data having a second virtual address contiguous with the first virtual address;
reading first data in an encrypted form from a location of the physical memory which is non-contiguous to a second location of the second data in the physical memory; and
decrypting the encrypted first data using at least one key which is dependent on virtual address information associated with the virtual buffer.

40. The method of claim 37 wherein the identification information identifies a type of transaction associated with at least one of data and the functional block.

41. The method of claim 37 wherein the command is a write command and determining whether to execute the command comprises determining if data is to be encrypted or blocked based on the received identification information.

42. The method of claim 37 wherein the command is a read command and determining whether to execute the command comprises determining whether to decrypt data based on the received identification information.

43. A system, comprising:
data processing circuitry having a virtual data buffer, the virtual buffer being configured to store data packets of a data stream, contiguous virtual addresses of the virtual buffer being associated with discontiguous addresses of a physical memory; and cyphering circuitry coupled to the data processing circuitry and configured to respond to a command received from the data processing circuitry by:

determining, based on identification information associated with the virtual buffer, whether to execute the command; and in response to a determination to execute the command:

determining a key based on virtual buffer address information associated with the virtual buffer, wherein the key is generated based on an address-based seed associated with a window defined in the virtual address space; and initiating execution of the command using the determined key.

44. The system of claim 43 wherein the cyphering circuitry is configured to respond to a determination to execute a received write command by, encrypting data associated with the write command using the key; and initiating writing of the encrypted data to a location of the physical memory associated with the address of the virtual buffer.

45. The system of claim 43 wherein the cyphering circuitry is configured to respond to a determination to execute a received read command by, initiating retrieval of encrypted data from a location in the physical memory associated with the address of the virtual buffer; and decrypting the retrieved data using the determined key.

* * * * *